(12) United States Patent
Kitaoka et al.

(10) Patent No.: US 11,075,528 B2
(45) Date of Patent: Jul. 27, 2021

(54) SERVER FOR CHARGE-DISCHARGE SYSTEM, CHARGE-DISCHARGE SYSTEM, AND SERVER CONTROL METHOD

(71) Applicant: TOYOTA JIDOSHA KABUSHIKI KAISHA, Toyota (JP)

(72) Inventors: Hironobu Kitaoka, Nisshin (JP); Jun Koreishi, Toyota (JP); Hiroaki Sugiyama, Nagoya (JP); Daisuke Takanohashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 519 days.

(21) Appl. No.: 15/900,227

(22) Filed: Feb. 20, 2018

(65) Prior Publication Data

US 2018/0241229 A1 Aug. 23, 2018

(30) Foreign Application Priority Data

Feb. 21, 2017 (JP) .............................. JP2017-030443

(51) Int. Cl.
*H02J 7/00* (2006.01)
*H02J 7/14* (2006.01)
(Continued)

(52) U.S. Cl.
CPC ............ *H02J 7/0027* (2013.01); *B60L 53/00* (2019.02); *B60L 53/51* (2019.02); *B60L 53/52* (2019.02);
(Continued)

(58) Field of Classification Search
USPC .......................................................... 320/109
See application file for complete search history.

(56) References Cited

U.S. PATENT DOCUMENTS

| 6,459,175 B1* | 10/2002 | Potega ................. H02J 7/00047 307/149 |
| 2011/0175569 A1* | 7/2011 | Austin ..................... B60L 53/63 320/109 |
| 2012/0265459 A1* | 10/2012 | Sfaelos ................. B60L 53/305 702/61 |
| 2014/0100708 A1* | 4/2014 | Ukita ................... H02J 7/00036 700/297 |

(Continued)

FOREIGN PATENT DOCUMENTS

| CN | 103688435 A | 3/2014 |
| DE | 102010029118 A1 | 11/2011 |

(Continued)

*Primary Examiner* — Alexis B Pacheco
(74) *Attorney, Agent, or Firm* — Hunton Andrews Kurth LLP

(57) ABSTRACT

A server for a charge-discharge system includes a controller. The controller is configured to communicate with a plurality of registered vehicles each equipped with a chargeable-dischargeable battery. The controller is configured to acquire information on a scheduled start time of a next travel of each of the registered vehicles. The controller is configured to acquire electric power information. The controller is configured to determine, based on the scheduled travel start time and the electric power information, a target vehicle of which the battery is to be charged or discharged from among the registered vehicles that are at least parked. The controller is configured to send to the target vehicle either a charge command that orders the battery of the target vehicle to be charged or a discharge command that orders the battery of the target vehicle to be discharged.

4 Claims, 13 Drawing Sheets

(51) Int. Cl.
*B60L 55/00* (2019.01)
*B60L 53/63* (2019.01)
*B60L 53/68* (2019.01)
*B60L 53/00* (2019.01)
*B60L 53/65* (2019.01)
*B60L 53/51* (2019.01)
*B60L 53/52* (2019.01)
*B60L 53/53* (2019.01)

(52) U.S. Cl.
CPC ............... *B60L 53/53* (2019.02); *B60L 53/63* (2019.02); *B60L 53/65* (2019.02); *B60L 53/68* (2019.02); *B60L 55/00* (2019.02); *H02J 7/007* (2013.01); *H02J 7/0021* (2013.01); *B60L 2260/58* (2013.01); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/14* (2013.01)

(56) References Cited

U.S. PATENT DOCUMENTS

| | | | |
|---|---|---|---|
| 2014/0320062 | A1 | 10/2014 | Murayama |
| 2014/0336965 | A1 | 11/2014 | Mori et al. |
| 2015/0283912 | A1* | 10/2015 | Shimizu .............. B60L 11/1862 320/157 |
| 2016/0236584 | A1* | 8/2016 | Miftakhov ............ B60L 53/665 |
| 2018/0273018 | A1* | 9/2018 | Follen ................ B60H 1/00428 |

FOREIGN PATENT DOCUMENTS

| | | |
|---|---|---|
| JP | H06-030532 A | 2/1994 |
| JP | H08-098304 A | 4/1996 |
| JP | 2011135727 A | 7/2011 |
| JP | 2012050222 A | 3/2012 |
| JP | 2013027154 A | 2/2013 |
| JP | 2013051851 A | 3/2013 |
| JP | 2013109609 A | 6/2013 |
| JP | 2014135877 A | 7/2014 |

* cited by examiner

FIG. 3

| VEHICLE ID | PARKING STATE | SOC | CHARGE STATUS | AVAILABLE TIME T_ctrl | SCHEDULED TRAVEL START TIME | PARKING START TIME | POINT |
|---|---|---|---|---|---|---|---|
| 000001 | ○ | SOC_C | STANDBY | T1 | ** | ** | 100 |
| 000002 | × | N/A | N/A | N/A | N/A | N/A | 2000 |
| 000003 | ○ | 0 | STANDBY | T2 | ** | ** | 600 |
| 000004 | ○ | N/A | DIS-CHARGING | N/A | ** | ** | 500 |
| 000005 | ○ | N/A | CHARGING | - | ** | ** | 300 |
| ... | ... | ... | ... | ... | ... | ... | ... |

SERVER FOR CHARGE-DISCHARGE SYSTEM, CHARGE-DISCHARGE SYSTEM, AND SERVER CONTROL METHOD

INCORPORATION BY REFERENCE

The disclosure of Japanese Patent Application No. 2017-030443 filed on Feb. 21, 2017 including the specification, drawings and abstract is incorporated herein by reference in its entirety.

BACKGROUND

1. Technical Field

The present disclosure relates to a server for a charge-discharge system, a charge-discharge system, and a server control method.

2. Description of Related Art

A technique is known that involves calculating such a start time of a battery charge operation that the battery will be fully charged at an arbitrarily determined time, and then starting the battery charge operation at the calculated start time of the charge operation (e.g., see Japanese Patent Application Publication No. 06-030532).

SUMMARY

The above related art does not allow the state of charges (SOCs) of the batteries of a plurality of parked vehicles to be adjusted easily and appropriately according to a demand-and-supply relationship of electric power in an external electric power system. It is hoped that allowing the SOCs of the batteries of a plurality of parked vehicles to be adjusted according to the demand-and-supply relationship of electric power in the external electric power system will give the vehicles the ability to adjust electric power. For example, electric power obtained by discharging the batteries of parked vehicles will become available for accommodating an increase in demand for electric power in the external electric power system. On the other hand, when there is an oversupply of electric power in the external electric power system, charging the batteries of the vehicles can absorb the excess electric power supply.

To appropriately use the batteries of a plurality of parked vehicles for electric power adjustment, it is important to prepare the SOCs of the batteries of these vehicles in an adjustable state, as well as to take a scheduled start time of a next travel into account so as to be ready for the next travel. For example, if the batteries of all vehicles are fully discharged at the start of parking so as to preserve the battery life, these batteries have no electric power left to be discharged later. For vehicles which are parked and of which the scheduled start time of the next travel is close, it is important to raise the state of charge of the battery by the scheduled start time of the next travel.

With these points in mind, the present disclosure makes it possible to appropriately adjust the SOCs of the batteries of a plurality of vehicles according to a demand-and-supply relationship of electric power in an external electric power system.

A first aspect of the present disclosure is a server for a charge-discharge system. The server includes a controller configured to communicate with a plurality of registered vehicles each equipped with a chargeable-dischargeable battery. The controller is configured to acquire information on a scheduled start time of a next travel of each of the registered vehicles. The controller is configured to acquire electric power information. The electric power information is one of electric power system information that shows a demand-and-supply relationship of electric power in an external electric power system and an electric power adjustment request that is issued based on the relationship. The controller is configured to determine, based on the scheduled travel start time and the electric power information, a target vehicle of which the battery is to be charged or discharged from among the registered vehicles that are at least parked. The controller is configured to send to the target vehicle one of a charge command that orders the battery of the target vehicle to be charged and a discharge command that orders the battery of the target vehicle to be discharged.

The above configuration makes it possible to adjust the state of charges of the batteries of a plurality of registered vehicles according to a demand-and-supply relationship of electric power in an external electric power system and in an appropriate manner that takes the scheduled start time of the next travel into account.

In the server for the charge-discharge system, the controller may be configured to calculate, based on a current time and a charge start time that is determined according to the scheduled travel start time, an available time of each of the registered vehicles that is a time left from the current time until the charge start time, and the controller may be configured to determine the target vehicle based on the available time and the electric power information.

In the server for the charge-discharge system, the controller may be configured to determine, as the target vehicle, the registered vehicle of which the available time is not shorter than a predetermined time.

In the server for the charge-discharge system, the controller may be configured to determine, as the target vehicles, a predetermined number of the registered vehicles in ascending order of the available time.

In the server for the charge-discharge system, the controller may be configured to determine the predetermined number based on the electric power information.

In the server for the charge-discharge system, the controller may be configured to, when demand is exceeding supply according to the electric power information, determine the target vehicle of which the battery is to be discharged, and send the discharge command to the target vehicle of which the battery is to be discharged. The controller may be configured to, when supply is exceeding demand according to the electric power information, determine the target vehicle of which the battery is to be charged, and send the charge command to the target vehicle of which the battery is to be charged.

In the server for the charge-discharge system, the controller may be configured to acquire the electric power information from an external server.

A second aspect of the present disclosure is a charge-discharge system. The charge-discharge system includes a server, and a plurality of registered vehicles each equipped with a chargeable-dischargeable battery and communicably connected to the server for the charge-discharge system. The server includes a controller configured to acquire a scheduled start time of a next travel of each of the registered vehicles. The controller is configured to acquire electric power information. The electric power information is one of electric power system information that shows a demand-and-supply relationship of electric power in an external electric power system and an electric power adjustment request that is issued based on the relationship. The controller is configured to determine, based on the scheduled travel start time and the electric power system information, a target vehicle of which the battery is to be charged or discharged from among the registered vehicles that are at least parked. The controller is configured to send to the target vehicle one of a charge command that orders the battery of the target vehicle to be charged and a discharge command that orders the battery of the target vehicle to be discharged.

In the charge-discharge system, the registered vehicle may include an electronic control unit that sends information showing the scheduled start time of the next travel to the server at the start of parking. The electronic control unit may be configured to charge and discharge the battery in response to the command from the server.

In the charge-discharge system, the plurality of registered vehicles may be configured to, at the start of parking, discharge the battery to a second state of charge when the state of charge of the battery is higher than the second state of charge at the start of parking, and discharge the battery to a first state of charge lower than the second state of charge when the state of charge of the battery is not higher than the second state of charge at the start of parking.

The above configuration can prepare the state of charges of the batteries of the plurality of registered batteries in an adjustable state, as these registered vehicles are discharged at the start of parking to the first state of charge or the second state of charge according to the state of charge at the start of parking and the scheduled start time of the next travel. Securing registered vehicles that are discharged to the first state of charge lower than the second state of charge makes it possible to secure the charge capacity for electric power adjustment while extending the battery life. On the other hand, securing registered vehicles that are discharged to the second state of charge makes it possible to secure the discharge capacity for electric power adjustment while reducing the impact on the battery life. With both the charge capacity and the discharge capacity for electric power adjustment thus secured, it is possible to appropriately adjust the state of charges of the batteries of a plurality of vehicles according to a demand-and-supply relationship of electric power in an external electric power system.

In the charge-discharge system, the charge command may be a command that orders the battery to be charged such that the state of charge thereof increases to the second state of charge, and the discharge command may be a command that orders the battery to be discharged such that the state of charge thereof decreases to the first state of charge. The controller may be configured to determine the target vehicle from among one or more of the registered vehicles which are parked and of which the current state of charge of the battery is one of at the first state of charge and the second state of charge.

A third aspect of the present disclosure is a charge-discharge system. The charge-discharge system includes a server, and a plurality of registered vehicles that are each equipped with a chargeable-dischargeable battery and communicably connected to the server for the charge-discharge system. The registered vehicle is configured to discharge the battery to two or more different standby state of charges at the start of parking. The standby state of charge is an state of charge that is determined according to at least one of the state of charge of the battery at the start of parking and a scheduled start time of a next travel. The server is configured to determine, based on the current state of charges of the batteries of the plurality of registered vehicles and electric power information, a target vehicle of which the battery is to be charged or discharged from among the registered vehicles that are at least parked. The electric power information is one of electric power system information that shows a demand-and-supply relationship of electric power in an external electric power system and an electric power adjustment request that is issued based on the relationship.

The above configuration makes it possible to appropriately adjust the state of charges of the batteries of a plurality of vehicles according to a demand-and-supply relationship of electric power in an external electric power system.

A fourth aspect of the present disclosure is a control method of a server. The server includes a controller configured to communicate with a plurality of registered vehicles each equipped with a chargeable-dischargeable battery. The control method includes: acquiring, by the controller, information on a scheduled start time of a next travel of each of the registered vehicles; acquiring electric power information by the controller; determining, by the controller, a target vehicle of which the battery is to be charged or discharged from among the registered vehicles that are at least parked, based on the scheduled travel start time and the electric power information; and sending, by the controller, to the target vehicle one of a charge command that orders the battery of the target vehicle to be charged and a discharge command that orders the battery of the target vehicle to be discharged. The electric power information is one of electric power system information that shows a demand-and-supply relationship of electric power in an external electric power system and an electric power adjustment request that is issued based on the relationship.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a view showing an example of a state table;

DETAILED DESCRIPTION OF EMBODIMENTS

In the following, embodiments will be described in detail with reference to the accompanying drawings.

Figure 1:
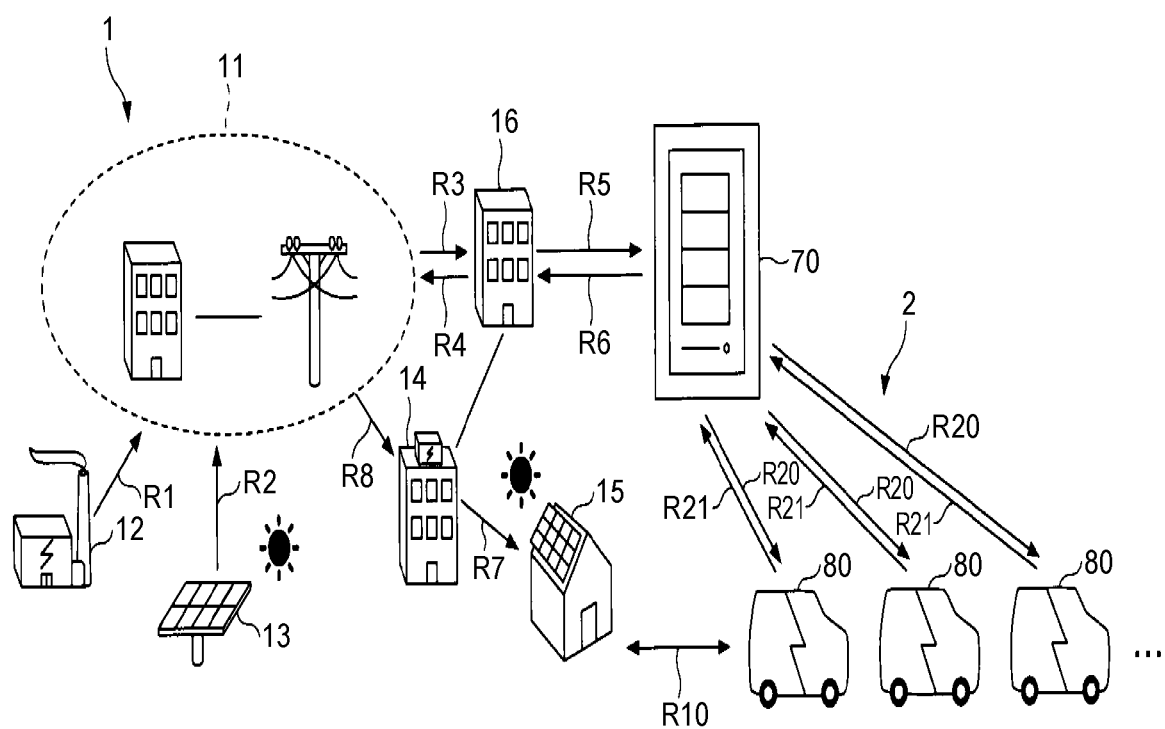
FIG. 1 is a schematic view of the overall configuration of an electric power demand adjustment system 1 according to an example.

FIG. 1 is a schematic view of the overall configuration of an electric power demand adjustment system 1 according to an example.

The electric power demand adjustment system 1 includes: a business operator 11 including an electric power trading company such as Japan Electric Power Exchange (abbreviated as JEPX), and an independent system operator (abbreviated as ISO) that operates a power transmission system independently of electric power providers; a power generation company 12; a retailer 14; and an aggregator 16 (an example of an intermediary company in electric power trade).

The business operator 11 accommodates an electric power demand from the retailer 14 (see arrow R8) by a supply of electric power from the power generation company 12 owning a thermal power plant, a nuclear power plant, etc. (see arrow R1) and electric power generated by a solar panel 13 using solar heat (see arrow R2) (also electric power generated from geothermal heat, wind power, wave power, etc.). The retailer 14 supplies (sells) electric power to a household (house) 15 etc. (see arrow R7). To ensure that the amount of electric power generated and the amount thereof consumed are equal for a stable electric power supply, the business operator 11 adjusts the demand-and-supply balance of electric power in an electric power system in cooperation with the retailer 14 and the aggregator 16.

The aggregator 16 receives a command from the business operator 11 (see arrow R3), and issues a command to a charge-discharge system 2 to be described later (see arrow R5). The aggregator 16 receives a notice (e.g., a notice on a control result) from the charge-discharge system 2 (see arrow R6), and notifies the business operator 11 of an adjustment result etc. (see arrow R4).

The charge-discharge system 2 includes a server 70 (an example of the "server for a charge-discharge system"), and a plurality of vehicles (hereinafter referred to as "chargeable-dischargeable vehicles 80") (an example of the "registered vehicles") each equipped with a chargeable-dischargeable battery (see battery 9 in FIG. 4). For example, this battery is a lithium-ion battery.

In cooperation with the plurality of chargeable-dischargeable vehicles 80, the server 70 executes an electric power adjustment process based on an electric power adjustment request that is one of commands from the aggregator 16 (see arrow R5). The electric power adjustment process will be described later.

The chargeable-dischargeable vehicles 80 are vehicles that can be charged with electricity supplied through a charge facility and can supply electricity to a facility outside the vehicle. The chargeable-dischargeable vehicles 80 are vehicles that are registered in advance by their respective users who accept that their vehicles will be incorporated in the charge-discharge system 2. The chargeable-dischargeable vehicle is a plug-in hybrid vehicle or an electric vehicle. The facility outside the vehicle is a facility that requires electric power (i.e., a facility having electric loads) and is located outside the vehicle. In this embodiment, for example, the facility outside the vehicle and the chargeable-dischargeable vehicle 80 are connected to each other through a charge-discharge connector etc. to realize transmission and reception of electric power. Alternatively, transmission and reception of electric power between the facility outside the vehicle and the chargeable-dischargeable vehicle 80 may be realized by a contactless method.

The server 70 and each chargeable-dischargeable vehicle 80 can bidirectionally communicate with each other through a network (see arrows R20, R21). For example, this network is a wireless communication network, but may also include the Internet, the World Wide Web, a virtual private network (VPN), a wide area network (WAN), and a wired network. The server 70 and the aggregator 16 can bidirectionally communicate with each other through a network (see arrows R5, R6).

The electric power demand adjustment system 1 shown in FIG. 1 except for the charge-discharge system 2 is shown as merely an example based on the current situation in Japan. Thus, the electric power demand adjustment system 1 except for the charge-discharge system 2 is subject to change in the future, and can have different aspects in different countries.

Figure 2:
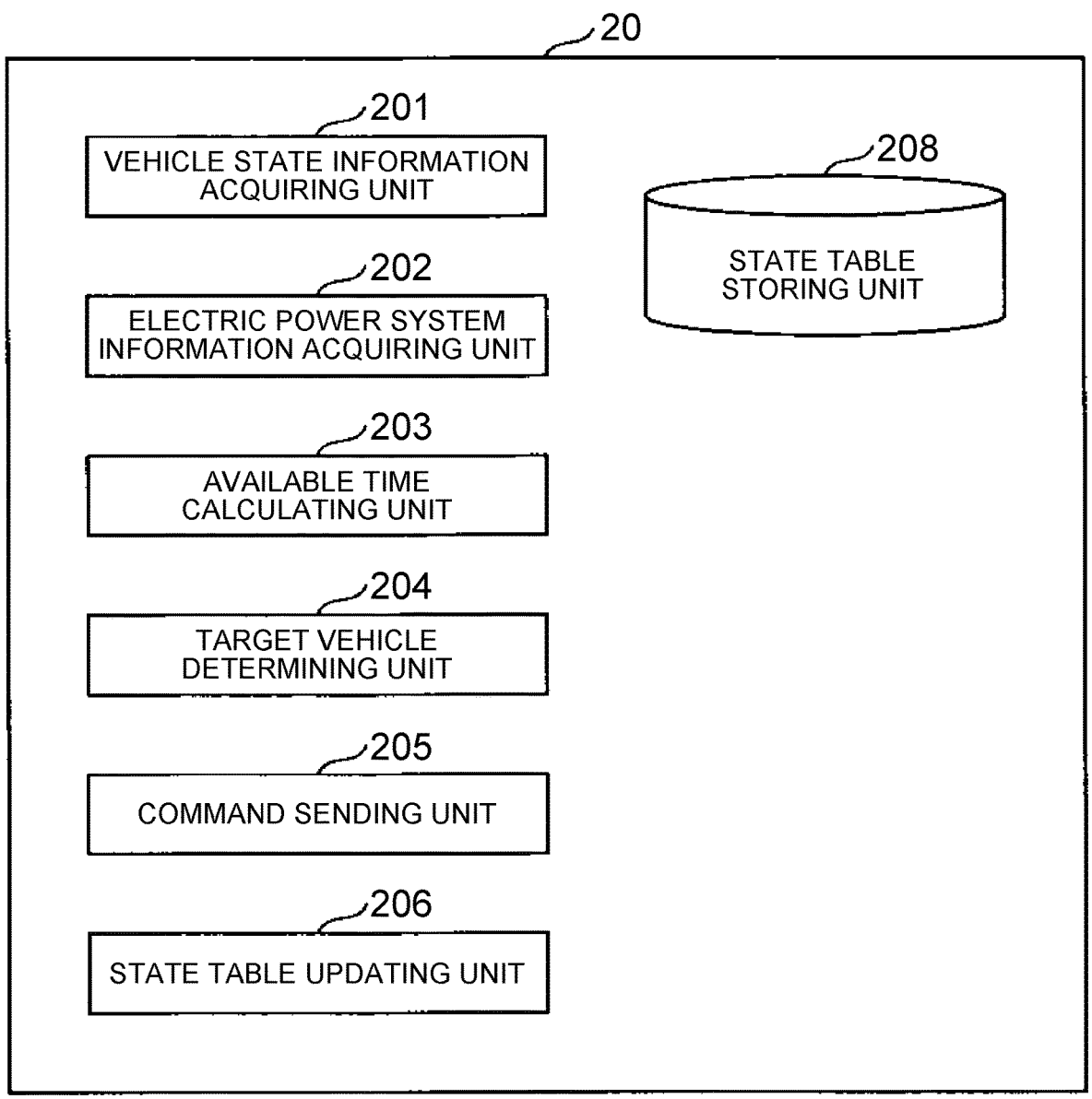
FIG. 2 is a view showing an example of the function block of a controller 20 of a server 70.

FIG. 2 is a view showing an example of the function block of the server 70. The server 70 is formed by a large-sized computer. The server 70 may be dispersedly provided in a plurality of regions.

As shown in FIG. 2, the server 70 includes a vehicle state information acquiring unit 201, an electric power system information acquiring unit 202, an available time calculating unit 203, a target vehicle determining unit 204, a command sending unit 205, a state table updating unit 206, and a state table storing unit 208. The vehicle state information acquiring unit 201, the electric power system information acquiring unit 202, the available time calculating unit 203, the target vehicle determining unit 204, the command sending unit 205, and the state table updating unit 206 can be realized as a central processing unit (CPU) inside the server 70 executes a program stored in a storage device. The state table storing unit 208 can be realized by an auxiliary storage device (e.g., a hard disk drive). The vehicle state information acquiring unit 201, the electric power system information acquiring unit 202, the available time calculating unit 203, the target vehicle determining unit 204, the command sending unit 205, and the state table updating unit 206 may be included in one controller 20 or may be included in a plurality of controllers.

The vehicle state information acquiring unit 201 acquires vehicle state information from each chargeable-dischargeable vehicle 80. The vehicle state information is information showing a vehicle state, and includes information showing a scheduled start time Ts of a next travel of each chargeable-dischargeable vehicle 80 that has started to be parked. For example, the scheduled travel start time Ts may be a time showing month, day, hour, and minute (i.e., second may be omitted). Minute may be shown in units of 15 minutes or 30 minutes. Other pieces of the vehicle state information will be described later.

In a modified example, the vehicle state information acquiring unit 201 may predict the scheduled start time Ts of the next travel of each chargeable-dischargeable vehicle 80. For example, the vehicle state information acquiring unit 201 may predict and acquire the scheduled start time Ts of the next travel of each chargeable-dischargeable vehicle 80 by machine learning based on big data including travel history data that is obtained from each chargeable-dischargeable vehicle 80.

The electric power system information acquiring unit 202 acquires the electric power adjustment request from a server (not shown) of the aggregator 16. The electric power adjustment request is issued according to a demand-and-supply relationship of electric power in an external electric power system. For example, when demand is exceeding supply, the electric power adjustment request is a request for discharge (power generation) (discharge request) asking that the supply shortage be compensated for. When supply is exceeding demand, the electric power adjustment request is a request for charge (charge request) asking that the excess supply be absorbed. The electric power adjustment request may include a specific adjustment request value. In this embodiment, the electric power adjustment request includes a specific adjustment request value A [Wh] along with a discharge request or a charge request. However, in the case where the adjustment request value is always the same, the electric power adjustment request need not include the adjustment request value A. In this case, when the server 70 receives an electric power adjustment request from the aggregator 16, this electric power adjustment request is regarded as including a specified adjustment request value.

In a modified example, the electric power system information acquiring unit 202 may acquire, instead of the electric power adjustment request, electric power system information that shows the demand-and-supply relationship of electric power in the external electric power system. As the electric power adjustment request is issued substantially based on the demand-and-supply relationship of electric power in the external electric power system, the electric power system information can serve the same function as the electric power adjustment request. For example, the electric power system information acquiring unit 202 may acquire the electric power system information from a server (not shown) of the business operator 11.

Based on the current time and such a charge start timing (hereinafter referred to as a "charge start time Tsc") that charge to a predetermined target SOC can be completed at the scheduled travel start time Ts, the available time calculating unit 203 calculates a time (hereinafter referred to as an "available time T_ctr") of each chargeable-dischargeable vehicle 80 that is a time left from the current time until the charge start timing. The predetermined target SOC is a desirable SOC at the start of a travel, and for example, is 100% in this embodiment. This is because a higher SOC allows the chargeable-dischargeable vehicle 80 to travel a longer cruising distance on electric power from the battery.

In this embodiment, for example, the available time calculating unit 203 calculates a required charge time Tch that is taken to charge so as to increase the current SOC to the predetermined target SOC. The available time calculating unit 203 calculates the charge start time Tsc as a time earlier than the scheduled travel start time Ts by the required charge time Tch. The required charge time Tch is determined according to the current SOC and the battery characteristics. The current SOC can be obtained based on information inside the state table storing unit 208 (to be described later). The battery characteristics can be obtained on the side of the server 70, for example, based on the product number of the battery that can be derived from vehicle information (initial information registered in advance) on the chargeable-dischargeable vehicle 80. The battery characteristics may be stored in advance in the state table storing unit 208, for example, as a charge electric power curve.

The available time T_ctr is a time for which the chargeable-dischargeable vehicle 80 is available for electric power adjustment, and represents a time from the current point in time. Accordingly, the available time T_ctr is the time from the current time to the charge start time Tsc, and can be calculated by Formula (1) below. Based on the available time T_ctr of each chargeable-dischargeable vehicle 80 and the electric power adjustment request, the target vehicle determining unit 204 determines target vehicles of which the batteries are to be charged or discharged from among controllable vehicles Vc. The target vehicles are vehicles that are used for electric power adjustment.

$$Ta=(\text{scheduled travel start time } \mathit{Ts}-\text{current time})-\text{required charge time } \mathit{Tch} \tag{1}$$

The controllable vehicle Vc is the chargeable-dischargeable vehicle 80 that is at least parked. This is because the chargeable-dischargeable vehicle 80 in a parked state can transmit and receive electric power to and from an external facility. Moreover, in this embodiment, for example, the controllable vehicle Vc is the chargeable-dischargeable vehicle 80 of which the current SOC of the battery is 0% or SOC_C %. The chargeable-dischargeable vehicle 80 of which the current SOC of the battery is 0% can be used for adjustment by charging, while the chargeable-dischargeable vehicle 80 of which the current SOC of the battery is SOC_C % can be used for adjustment by discharging.

The target vehicle determining unit 204 determines, as the target vehicles, those chargeable-dischargeable vehicles 80 of which the available time T_ctr is not shorter than a predetermined time Tth from among the controllable vehicles Vc. The predetermined time Tth corresponds to a time required for adjusting charge or discharge control to be described later. The predetermined time Tth depends on the SOC_C, the battery characteristics, etc., and is an adapted value adapted through testing etc. Further specific examples of the target vehicle determination method by the target vehicle determining unit 204 will be described later.

The command sending unit 205 sends a charge command or a discharge command to the target vehicles determined by the target vehicle determining unit 204. The command sending unit 205 sends a travel-starting charge start command to those chargeable-dischargeable vehicles 80 of which the available time T_ctr has become 0.

The state table updating unit 206 updates the state table inside the state table storing unit 208. The state table shows the state of each chargeable-dischargeable vehicle 80.

FIG. 3 is a view showing an example of the state table.

FIG. 3 shows, for each vehicle identification (ID), information on whether the vehicle is parked, the SOC, charge status, available time, scheduled travel start time, parking start time, and point. In FIG. 3, for the information on whether the vehicle is parked, circles mean that the vehicle is parked. "N/A" means that there is no applicable value, and "**" means that some information is stored.

The state table updating unit 206 updates the state table based on the vehicle state information acquired by the vehicle state information acquiring unit 201, the calculation result of the available time calculating unit 203, etc. Further details of the process executed by the state table updating unit 206 will be described later.

Figure 4:
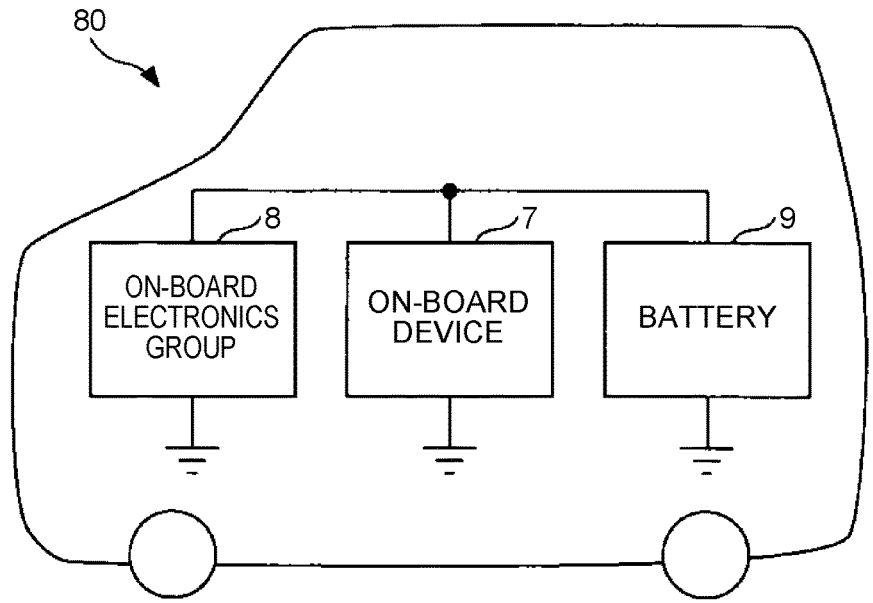
FIG. 4 is a view illustrating a chargeable-dischargeable vehicle 80.

FIG. 4 is a view illustrating the chargeable-dischargeable vehicle 80.

Here, one chargeable-dischargeable vehicle 80 will be described as an example with reference to FIG. 4 etc., but the other chargeable-dischargeable vehicles 80 may be substantially the same as this chargeable-dischargeable vehicle 80.

The chargeable-dischargeable vehicle 80 includes an on-board device 7, an on-board electronics group 8, and a battery 9.

The on-board device 7 is a processing device that executes various processes to be described later.

The on-board electronics group 8 represents a group of various electronics (sensors, ECUs, actuators) installed in the chargeable-dischargeable vehicle 80. The on-board electronics group 8 includes a charger that charges the battery 9 and a control device that controls this charger.

For example, the battery 9 is a lithium-ion battery. The chargeable-dischargeable vehicle 80 may include another battery, such as a lead battery, in addition to the battery 9 that is a lithium-ion battery. In other words, a power source system of the chargeable-dischargeable vehicle 80 may be a double power source system.

Figure 5:
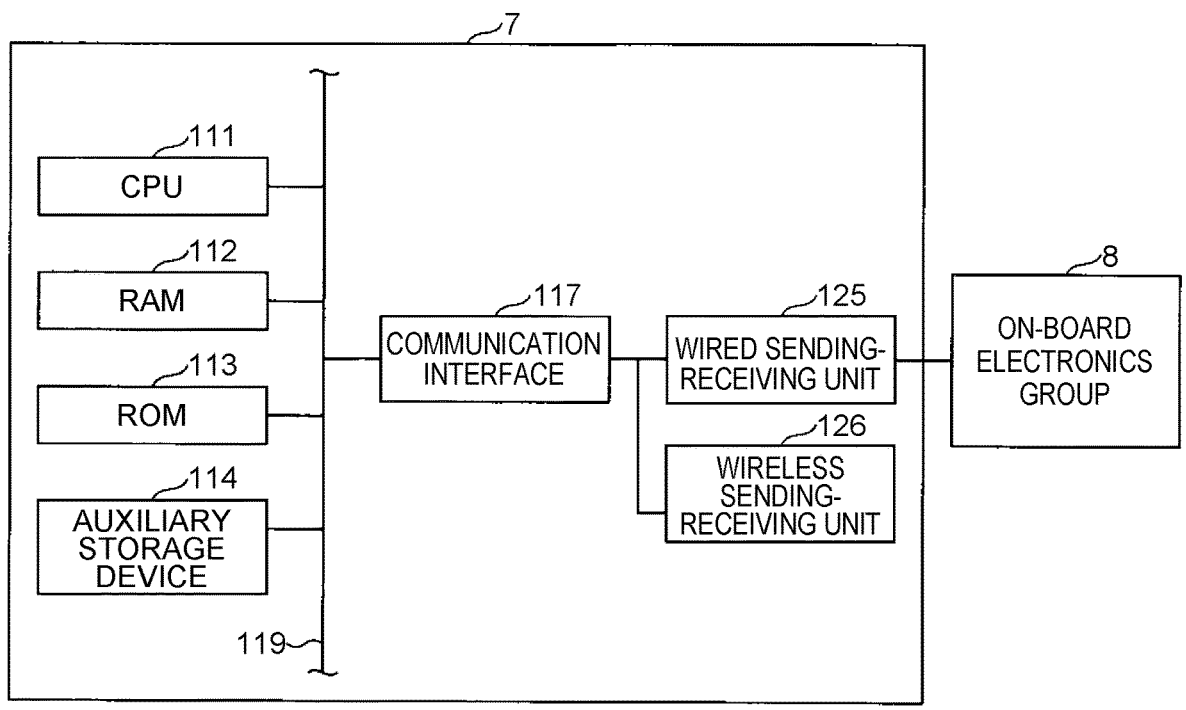
FIG. 5 is a view showing an example of the hardware configuration of an on-board device 7.

FIG. 5 is a view showing an example of the hardware configuration of the on-board device 7. FIG. 5 schematically shows the on-board electronics group 8 in association with the hardware configuration of the on-board device 7. The on-board device 7 includes an electronic control unit that records information.

The on-board device 7 includes: a CPU 111, a random access memory (RAM) 112, a read only memory (ROM) 113, an auxiliary storage device 114, and a communication interface 117 that are connected to one another through a bus 119; and a wired sending-receiving unit 125 and a wireless sending-receiving unit 126 that are connected to the communication interface 117.

For example, the auxiliary storage device 114 is an electrically erasable programmable read-only memory (EE-PROM) or a hard disk drive (HDD).

Examples of the wired sending-receiving unit 125 include a sending-receiving unit that can communicate using a vehicle network, such as a controller area network (CAN) or a local interconnect network (LIN). The wireless sending-receiving unit 126 is a sending-receiving unit capable of wireless communication using a wireless communication network of mobile phones.

Figure 6:
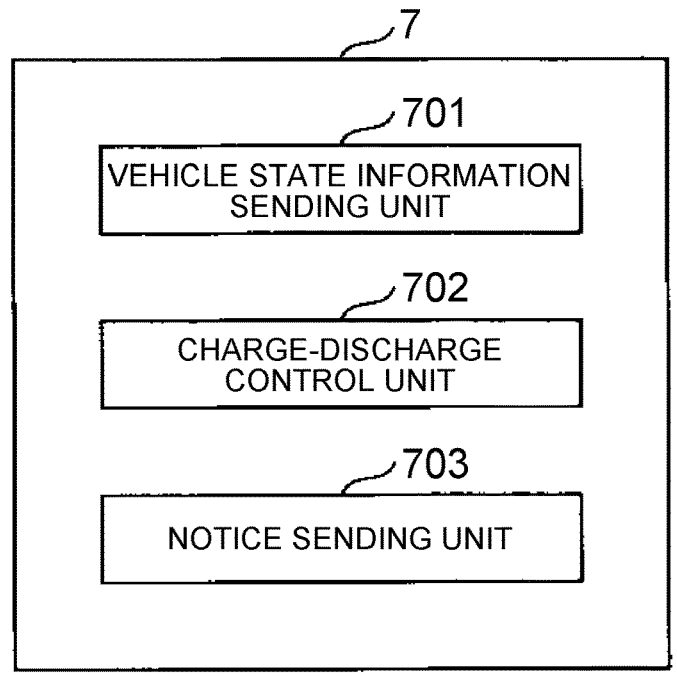
FIG. 6 is a view showing an example of the function block of the on-board device 7.

FIG. 6 is a view showing an example of the function block of the on-board device 7.

The on-board device 7 includes a vehicle state information sending unit 701 (an example of the "sending unit"), a charge-discharge control unit 702, and a notice sending unit 703. The vehicle state information sending unit 701, the charge-discharge control unit 702, and the notice sending unit 703 can be realized as the CPU 111 executes one or more programs stored in the ROM 113 etc.

The vehicle state information sending unit 701 sends the vehicle state information to the server 70.

Specifically, when parking has started, the vehicle state information sending unit 701 sends to the server 70, by a sending signal including the vehicle ID, information showing that parking has started and information showing the scheduled start time Ts of the next travel as the vehicle state information. Accordingly, in the state table storing unit 208 of the server 70, the information on whether the vehicle is parked, the information on the scheduled travel start time Ts, and the information on the parking start time are updated. As the information on the parking start time can be regarded as substantially the same as the time at which the server 70 receives the sending signal, it is not absolutely necessary to send the information on the parking start time to the server 70 as the vehicle state information. Nevertheless, the vehicle state information sending unit 701 may also send the information on the parking start time to the server 70 as the vehicle state information. The information showing that parking has started may be omitted. This is because the server 70 can detect that parking has started by receiving information showing the scheduled start time Ts of the next travel.

When a travel has started, the vehicle state information sending unit 701 sends information showing that a travel has started as the vehicle state information to the server 70 by a sending signal including the vehicle ID. The information on whether the vehicle is parked is updated in the state table storing unit 208 of the server 70.

When parking has started, the charge-discharge control unit 702 discharges the battery 9 to SOC_C % (an example of the "second SOC") or 0% (an example of the "first SOC"). The values SOC_C and 0 represent standby SOCs for realizing the adjusting charge or discharge control to be described later.

For example, in this embodiment, when the SOC is higher than SOC_C % at the start of parking, the charge-discharge control unit 702 discharges the battery 9 to SOC_C %, and when the SOC is lower than SOC_C % at the start of parking, the charge-discharge control unit 702 discharges the battery 9 to 0%. Hereinafter, this discharge control at the time of parking will also be referred to as "parking discharge control."

In a modified example, based on the scheduled travel start time Ts, the charge-discharge control unit 702 may discharge the battery 9 to 0% when the time from the current time to the scheduled travel start time Ts is longer than a predetermined reference time, and may discharge the battery 9 to SOC_C % when the time from the current time to the scheduled travel start time Ts is not longer than the predetermined reference time. This is because, when a relatively long parking period is expected, keeping the SOC of the battery 9 at 0% for as long a time as possible during the parking period is advantageous for the life of the battery 9.

Figure 7:
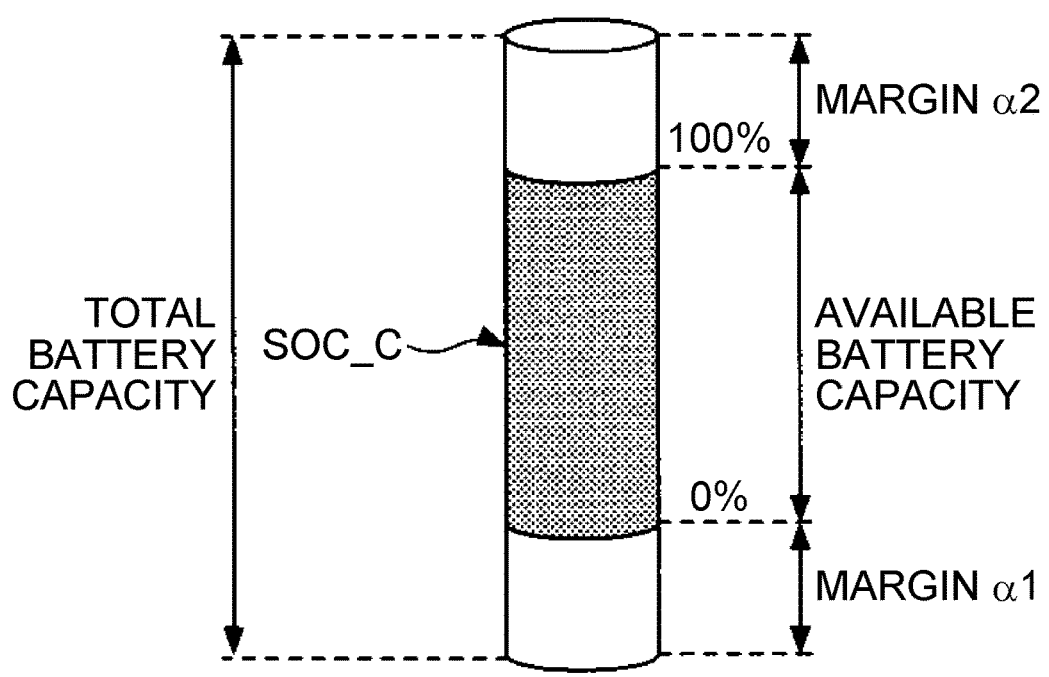
FIG. 7 is a view illustrating the definition of an SOC.

FIG. 7 is a view illustrating the definition of the SOC. In this specification, as schematically shown in FIG. 7, SOC 0% is a lower limit value of the available battery capacity except for a lower limit region (see margin α1) of the SOC that is not available. Similarly, as schematically shown in FIG. 7, SOC 100% is an upper limit value of the available battery capacity except for an upper limit region (see margin αλ) of the SOC that is not available.

The value SOC_C is an arbitrary value larger than zero, and is determined according to the discharge capacity for electric power adjustment. A higher SOC_C means a larger discharge capacity for electric power adjustment, but is disadvantageous for the life of the battery 9. The value SOC_C may be a fixed value, but may also be varied according to the current number of the controllable vehicles Vc. Specifically, the value SOC_C may be varied to a minimum value at which the required discharge capacity is provided by the current number of the controllable vehicles Vc as a whole.

The charge-discharge control unit 702 charges the battery 9 in response to the charge command from the server 70. In this case, the charge-discharge control unit 702 charges the battery 9 so that the SOC thereof increases to SOC_C %. The charge-discharge control unit 702 discharges the battery 9 in response to the discharge command from the server 70. In this case, the charge-discharge control unit 702 discharges the battery 9 so that the SOC thereof decreases to 0%. Hereinafter, this charge or discharge control according to the charge or discharge command from the server 70 will also be referred to as the "adjusting charge or discharge control."

In response to the travel-starting charge start command from the server 70, the charge-discharge control unit 702 charges the battery 9 to the predetermined target SOC (in this embodiment, 100%). Hereinafter, this charge control executed for starting a travel will also be referred to as "traveling charge control."

The notice sending unit 703 notifies the server 70 upon completion of the parking discharge control. Specifically, upon completion of the parking discharge control, the notice sending unit 703 sends to the server 70, by a sending signal including the vehicle ID, a parking discharge completion notice indicating that the battery 9 has been discharged. The parking discharge completion notice includes information showing the SOC (SOC_C or 0) after discharge.

The notice sending unit 703 notifies the server 70 at the start and end of the adjusting charge or discharge control. Specifically, when the battery 9 starts to be charged in response to the charge command from the server 70, the notice sending unit 703 sends an adjusting charge start notice to the server 70 by a sending signal including the vehicle ID. Then, when the battery 9 has been charged, the notice sending unit 703 sends an adjusting charge completion notice to the server 70 by a sending signal including the vehicle ID. The adjusting charge completion notice includes information on the amount of electric power charged (i.e., the amount of electric power adjusted). Similarly, when the battery 9 has started to be discharged in response to the discharge command from the server 70, the notice sending unit 703 sends an adjusting discharge start notice to the server 70 by a sending signal including the vehicle ID. Then, when the battery 9 has been discharged, the notice sending unit 703 sends an adjusting discharge completion notice to the server 70 by a sending signal including the vehicle ID. The adjusting discharge completion notice includes information on the amount of electric power discharged (i.e., the amount of electric power adjusted).

The notice sending unit 703 notifies the server 70 upon completion of the travelling charge control. Specifically, upon completion of the travelling charge control, the notice sending unit 703 sends a travelling charge completion notice indicating that the battery 9 has been charged to the predetermined target SOC to the server 70 by a sending signal including the vehicle ID.

Next, an example of the operations of the charge-discharge system 2 will be described using flowcharts with reference to FIG. 8 to FIG. 14. FIG. 8 to FIG. 14 are views illustrating a main part of the operations of the charge-discharge system 2.

Figure 8:
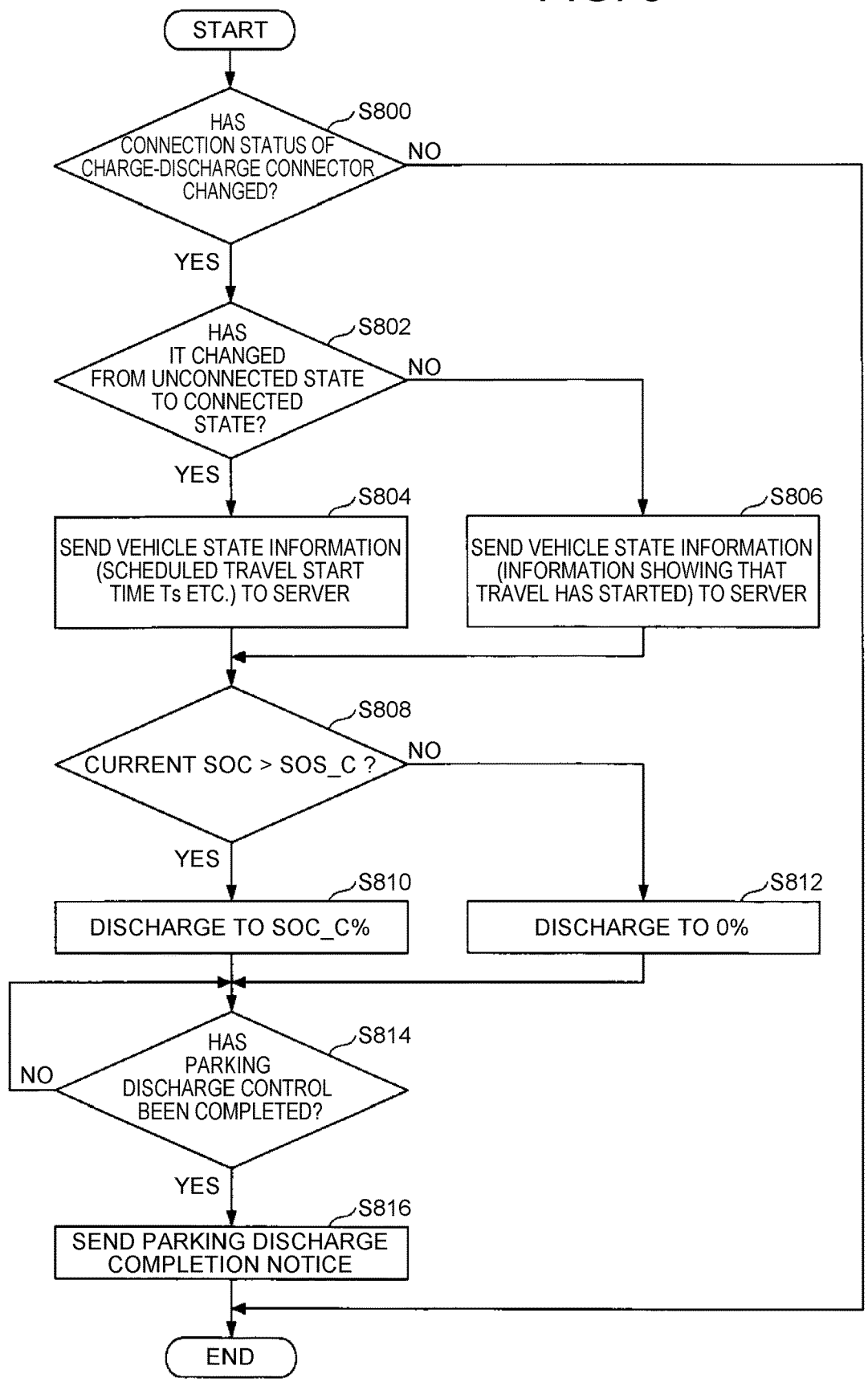
FIG. 8 is a flowchart showing an example of a process executed by the on-board device 7 in relation to parking discharge control.

FIG. 8 is a flowchart showing an example of a process executed by the on-board device 7 in relation to the parking discharge control.

In step S800, the vehicle state information sending unit 701 determines whether the connection status of the charge-discharge connector has changed. When the determination result is "YES," the process moves to step S802, and otherwise the process ends here.

In step S802, the vehicle state information sending unit 701 determines whether the connection status of the charge-discharge connector has changed from a disconnected state to a connected state. When the determination result is "YES," the process moves to step S804, and otherwise (i.e., when the connection status of the charge-discharge connector has changed from the connected state to the disconnected state) the process moves to step S806.

In step S804, the vehicle state information sending unit 701 sends information showing that parking has started and information showing the scheduled start time Ts of the next travel to the server 70 by a sending signal including the vehicle ID.

In step S806, when a travel has started, the vehicle state information sending unit 701 sends information showing that a travel has started to the server 70 by a sending signal including the vehicle ID.

In step S808, the charge-discharge control unit 702 determines whether the current SOC is higher than SOC_C %. When the determination result is "YES," the process moves to step S810, and otherwise the process moves to step S812.

In step S810, the charge-discharge control unit 702 discharges the battery 9 to SOC_C %.

In step S812, the charge-discharge control unit 702 discharges the battery 9 to 0%.

In step S814, the notice sending unit 703 determines whether the parking discharge control (step S810 or step S812) by the charge-discharge control unit 702 has been completed. When the determination result is "YES," the process moves to step S816, and otherwise the notice sending unit 703 waits for the completion of the parking discharge control.

In step S816, the notice sending unit 703 sends the parking discharge completion notice to the server 70.

Figure 9:
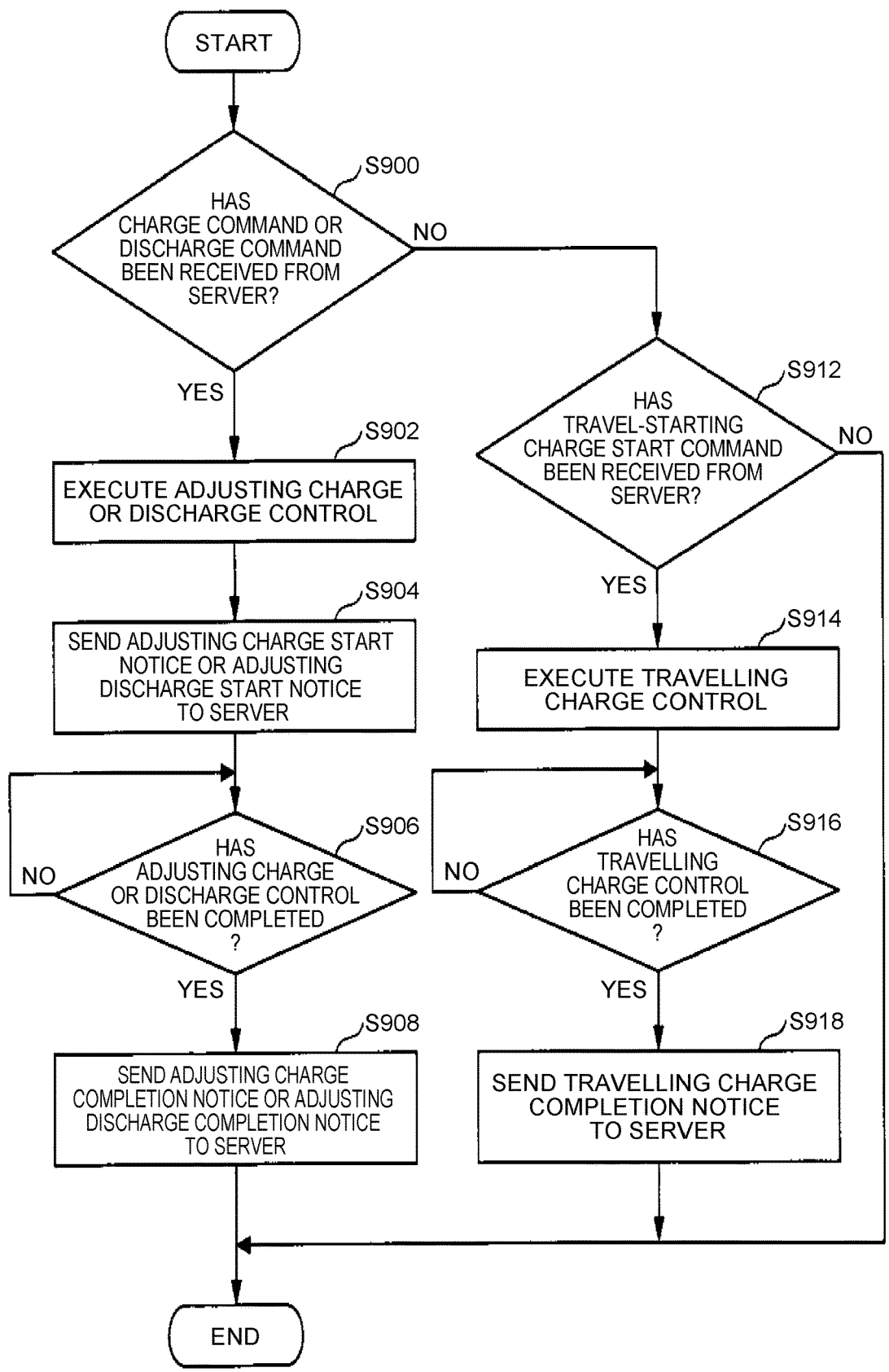
FIG. 9 is a flowchart showing an example of a process executed by the on-board device 7 in relation to adjusting charge or discharge control etc.

FIG. 9 is a flowchart showing an example of a process executed by the on-board device 7 in relation to the adjusting charge or discharge control etc.

In step S900, the charge-discharge control unit 702 determines whether the charge command or the discharge command has been received from the server 70. When the determination result is "YES," the process moves to step S902, and otherwise the process moves to step S912.

In step S902, the charge-discharge control unit 702 executes the adjusting charge or discharge control according to the charge or discharge command from the server 70. The adjusting charge or discharge control has already been described above.

In step S904, the notice sending unit 703 sends the adjusting charge start notice or the adjusting discharge start notice to the server 70. Specifically, when the adjusting charge or discharge control is the charge control, the notice sending unit 703 sends the adjusting charge start notice to the server 70, and when the adjusting charge or discharge control is the discharge control, the notice sending unit 703 sends the adjusting discharge start notice to the server 70.

In step S906, the notice sending unit 703 determines whether the adjusting charge or discharge control has been completed. When the determination result is "YES," the process moves to step S906, and otherwise the notice sending unit 703 waits for the completion of the adjusting charge or discharge control.

In step S908, the notice sending unit 703 sends the adjusting charge completion notice or the adjusting discharge completion notice to the server 70. Specifically, when the adjusting charge or discharge control is the charge control, the notice sending unit 703 sends the adjusting charge completion notice to the server 70, and when the adjusting charge or discharge control is the discharge control, the notice sending unit 703 sends the adjusting discharge completion notice to the server 70.

In step S912, the charge-discharge control unit 702 determines whether the travel-starting charge start command has been received. When the determination result is "YES," the process moves to step S914, and otherwise the process ends here.

In step S914, the charge-discharge control unit 702 executes the travelling charge control. Specifically, the charge-discharge control unit 702 charges the battery 9 to the predetermined target SOC (in this embodiment, 100%).

In step S916, the notice sending unit 703 determines whether the travelling charge control has been completed. When the determination result is "YES," the process moves to step S918, and otherwise the notice sending unit 703 waits for the completion of the travelling charge control.

In step S918, the notice sending unit 703 sends the travelling charge completion notice to the server 70.

Figure 10:
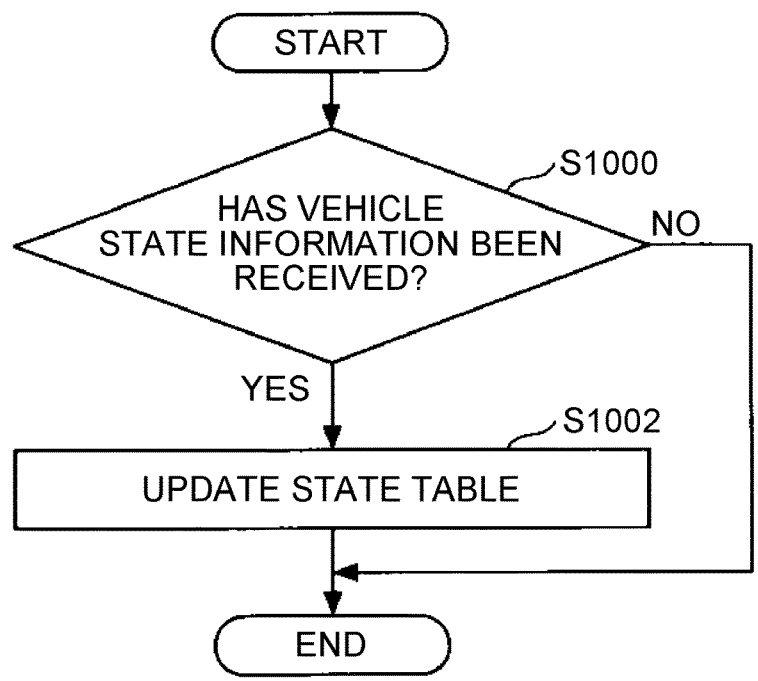
FIG. 10 is a flowchart showing an example of a state table update process (No. 1) executed by the server 70.

FIG. 10 is a flowchart showing an example of a state table update process (No. 1) executed by the server 70.

In step S1000, the state table updating unit 206 determines whether the vehicle state information acquiring unit 201 has acquired the vehicle state information. When the determination result is "YES," the process moves to step S1002, and otherwise the process ends here.

In step S1002, the state table updating unit 206 updates the state table (see FIG. 3) inside the state table storing unit 208 based on the vehicle state information acquired by the vehicle state information acquiring unit 201. For example, when the vehicle state information sent in step S804 of FIG. 8 is received in step S1000, the state table updating unit 206 updates the information on whether the vehicle is parked, the information on the scheduled travel start time Ts, and the information on the parking start time. In this case, the state table updating unit 206 changes the information on whether the vehicle is parked from "not parked (cross)" to "parked (circle)." When the vehicle state information sent in step S806 of FIG. 8 is received in step S1000, the state table updating unit 206 changes the information on whether the vehicle is parked from "parked (circle)" to "not parked (cross)."

Figure 11:
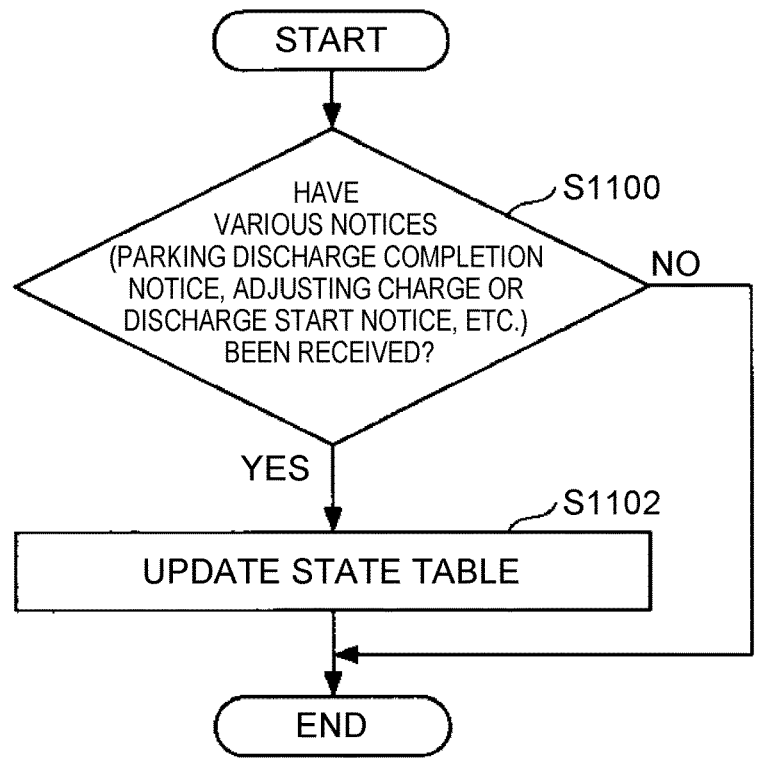
FIG. 11 is a flowchart showing an example of a state table update process (No. 2) executed by the server 70.

FIG. 11 is a flowchart showing an example of a state table update process (No. 2) executed by the server 70.

In step S1100, the state table updating unit 206 determines whether various notices (parking discharge completion notice, adjusting charge or discharge start notice, adjusting charge or discharge completion notice, and travelling charge completion notice) have been received from the notice sending unit 703 of the on-board device 7. When the determination result is "YES," the process moves to step S1002, and otherwise the process ends here.

In step S1102, the state table updating unit 206 updates the state table (see FIG. 3) inside the state table storing unit 208 according to the notice received from the notice sending unit 703.

Specifically, when the parking discharge completion notice is received, the state table updating unit 206 updates the charge status of the corresponding vehicle ID to "standby," and updates the SOC in the state table to "SOC_C" or "0" according to the information contained in the parking discharge completion notice. When the adjusting charge start notice is received, the state table updating unit 206 updates the charge status of the corresponding vehicle ID to "charging." When the adjusting discharge start notice is received, the state table updating unit 206 updates the charge status of the corresponding vehicle ID to "discharging." When the adjusting charge completion notice is received, the state table updating unit 206 updates the charge status of the corresponding vehicle ID to "standby," and updates the SOC in the state table to "SOC_C." When the adjusting discharge completion notice is received, the state table updating unit 206 updates the charge status of the corresponding vehicle ID to "standby," and updates the SOC in the state table to "0." When the travelling charge completion notice is received, the state table updating unit 206 updates the SOC of the corresponding vehicle ID in the state table to "100."

Figure 12:
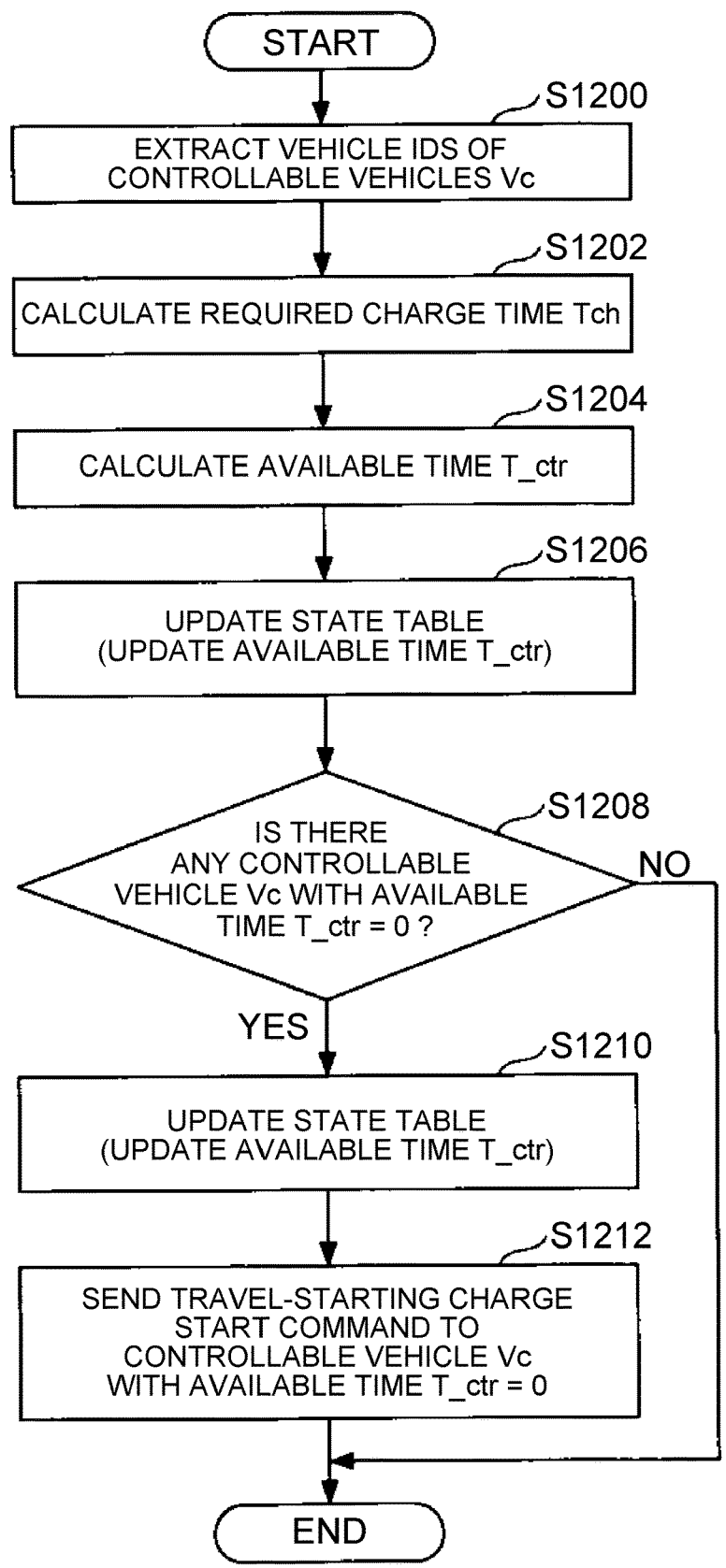
FIG. 12 is a flowchart showing examples of a state table update process (No. 3) and a travel-starting charge start command sending process that are executed by the server 70.

FIG. 12 is a flowchart showing examples of a state table update process (No. 3) and a travel-starting charge start command sending process that are executed by the server 70. The processes shown in FIG. 12 are repeatedly executed in predetermined control cycles. The processes shown in FIG. 12 may also be executed once subsequently to the process of FIG. 11, after the various notices (parking discharge completion notice, adjusting charge or discharge start notice, adjusting charge or discharge completion notice, and travelling charge completion notice) are received from the notice sending unit 703 of the on-board device 7. The processes shown in FIG. 12 are executed on request from the target vehicle determining unit 204 as will be described later.

In step S1200, the available time calculating unit 203 extracts the vehicle IDs of the chargeable-dischargeable vehicles 80 which are parked and of which the charge status is standby, based on the state table inside the state table storing unit 208. The chargeable-dischargeable vehicles 80 which are parked and of which the charge status is standby are the "controllable vehicles Vc."

In step S1202, the available time calculating unit 203 calculates the required charge time Tch of each of the controllable vehicles Vc corresponding to the vehicle IDs extracted in step S1200. The required charge time Tch has already been described above.

In step S1204, the available time calculating unit 203 calculates the available time T_ctr of each of the controllable vehicles Vc corresponding to the vehicle IDs extracted in step S1200, from the current time, the required charge time Tch, and the scheduled travel start time Ts. The available time T_ctr has already been described above.

In step S1206, the state table updating unit 206 updates the available time T_ctr of the vehicle IDs extracted in step S1200 in the state table (see FIG. 3) inside the state table storing unit 208, based on the available time T_ctr obtained in step S1204.

In step S1208, the state table updating unit 206 determines whether there is any controllable vehicle Vc of which the available time T_ctr has become 0 based on the state table (see FIG. 3) inside the state table storing unit 208. When the determination result is "YES," the process moves to step S1210, and otherwise the process ends here.

In step S1210, for the vehicle IDs of the controllable vehicles Vc of which the available time T_ctr has become 0, the state table updating unit 206 updates the available time T_ctr to "N/A" and updates the charge status to "charging" in the state table (see FIG. 3) inside the state table storing unit 208.

In step S1212, the command sending unit 205 sends the travel-starting charge start command to the controllable vehicles Vc of which the available time T_ctr has become 0.

Figure 13:
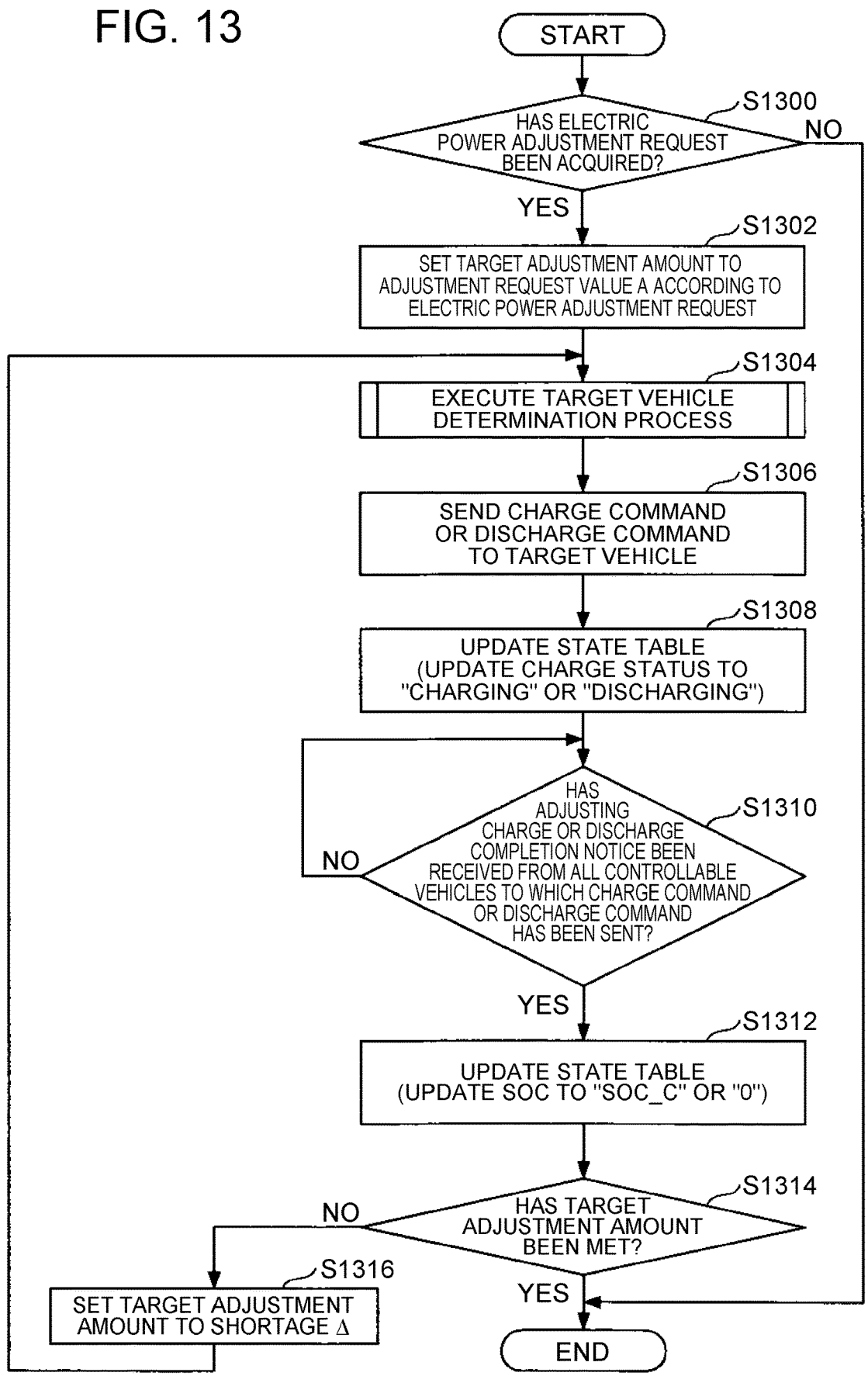
FIG. 13 is a flowchart showing examples of a state table update process (No. 4) and a charge or discharge command sending process that are executed by the server 70.

FIG. 13 is a flowchart showing examples of a state table update process (No. 4) and a charge or discharge command sending process that are executed by the server 70.

In step S1300, the command sending unit 205 determines whether the electric power system information acquiring unit 202 has acquired the electric power adjustment request. When the determination result is "YES," the process moves to step S1302, and otherwise the process ends here.

In step S1302, based on the electric power adjustment request received in step S1300, the command sending unit 205 sets a target adjustment amount to the adjustment request value A [Wh] according the electric power adjustment request.

In step S1304, the command sending unit 205 gives the target adjustment amount to the target vehicle determining unit 204, and orders the target vehicle determining unit 204 to execute the target vehicle determination process. In the target vehicle determination process, the target vehicle determining unit 204 determines, as the target vehicles, those chargeable-dischargeable vehicles 80 of which the available time T_ctr is not shorter than the predetermined time Tth from among the controllable vehicles Vc. The target vehicle determination process will be described later with reference to FIG. 14.

In step S1306, the command sending unit 205 sends the charge command or the discharge command to the target vehicles determined in step S1304. When the electric power adjustment request is the charge request (supply>demand), the target vehicles are vehicles to be charged, and the command sending unit 205 sends the charge command to the vehicles to be charged determined in step S1304. On the other hand, when the electric power adjustment request is the discharge request (demand>supply), the target vehicles are vehicles to be discharged, and the command sending unit 205 sends the discharge command to the vehicles to be discharged determined in step S1304.

In step S1308, the state table updating unit 206 updates the state table (see FIG. 3) inside the state table storing unit 208 based on the sending result of the command sending unit 205 in step S1306. Specifically, for the vehicle IDs of the controllable vehicles Vc to which the command sending unit 205 has sent the charge command or the discharge command, the state table updating unit 206 updates the charge status to "charging" or "discharging" according to the charge command or the discharge in the state table (see FIG. 3) inside the state table storing unit 208.

In step S1310, the state table updating unit 206 determines whether the adjusting charge or discharge completion notice has been received from all the controllable vehicles Vc to which the charge command or the discharge command has been sent. When the determination result is "YES," the process moves to step S1312, and otherwise the state table updating unit 206 waits for the reception of the adjusting charge or discharge completion notice.

In step S1312, the state table updating unit 206 updates the state table (see FIG. 3) inside the state table storing unit 208. Specifically, for the vehicle IDs of the controllable vehicles Vc to which the command sending unit 205 has sent the charge command or the discharge command, the state table updating unit 206 updates the charge status to "standby" and updates the SOC to "SOC_C" or "0" in the state table (see FIG. 3) inside the state table storing unit 208 according to the charge command or the discharge command. Specifically, in the case of the charge command, the state table updating unit 206 updates the SOC in the state table to "SOC_C," and in the case of the discharge command, the state table updating unit 206 updates the SOC in the state table to "0." Moreover, for the vehicle IDs of the controllable vehicles Vc to which the command sending unit 205 has sent the charge command or the discharge command, the state table updating unit 206 updates the point by adding a predetermined point (e.g., 100 points) thereto. Thus, points may be granted to those chargeable-dischargeable vehicles 80 that have contributed to electric power adjustment. This is expected to promote an increase in the number of the registered chargeable-dischargeable vehicles 80 (the number of users). If the number of the registered chargeable-dischargeable vehicles 80 (the number of users) increases, the capacity for electric power adjustment of the charge-discharge system 2 as a whole can be increased.

In step S1314, the command sending unit 205 determines whether the target adjustment amount is met based on all the adjusting charge and discharge completion notices received in step S1310. Specifically, the command sending unit 205 calculates the amount of electric power adjusted by the current electric power adjustment (the total of the amount of electric power adjusted by the controllable vehicles Vc to which the command sending unit 205 has sent the charge command or the discharge command) based on all the adjusting charge and discharge completion notices received in step S1310. Then, the command sending unit 205 calculates a shortage $\Delta$ that is a difference between the amount of electric power adjusted by the current electric power adjustment and the target adjustment amount set in step S1302, and determines whether the shortage $\Delta$ is smaller than a predetermined threshold value. The predetermined threshold value corresponds to an amount of electric power that is adjustable by one controllable vehicle Vc. When the difference is smaller than the predetermined threshold value, the command sending unit 205 determines that the target adjustment amount is met, and the process ends here. On the other hand, when the difference is not smaller than the predetermined threshold value, the process continues from step S1304 via step S1316.

In step S1316, the command sending unit 205 sets the target adjustment amount to the shortage $\Delta$[Wh] set in step S1312.

Figure 14:
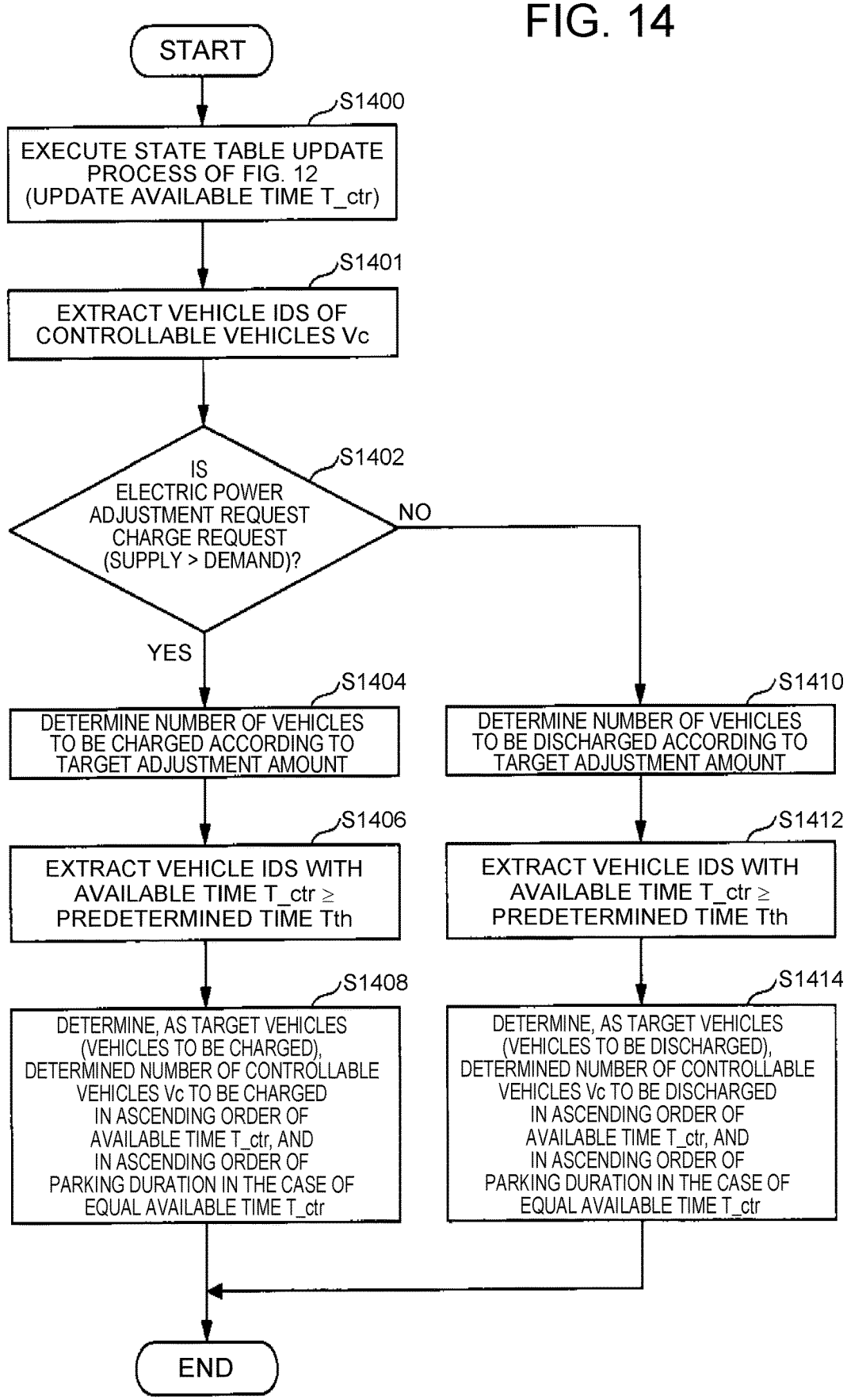
FIG. 14 is a flowchart showing an example of a target vehicle determination process executed by the server 70.

FIG. 14 is a flowchart showing an example of the target vehicle determination process executed by the server 70. The process of FIG. 14 is executed as step S1304 of FIG. 13.

In step S1400, the target vehicle determining unit 204 starts the state table update process (No. 3) shown in FIG. 12, and waits for the completion of the state table update process (No. 3) shown in FIG. 12. However, step S1400 may be omitted if the latest end time of the state table update process (No. 3) shown in FIG. 12 is sufficiently close to the current time.

In step S1401, the target vehicle determining unit 204 extracts the vehicle IDs of the controllable vehicles Vc (the chargeable-dischargeable vehicles 80 which are parked and of which the charge status is standby) based on the state table (see FIG. 3) inside the state table storing unit 208.

In step S1402, the target vehicle determining unit 204 determines whether the electric power adjustment request received in step S1300 is the charge request (supply>demand). When the determination result is "YES," the process moves to step S1404, and otherwise the process moves to step S1410.

In step S1404, the target vehicle determining unit 204 determines the number of vehicles to be charged according to the target adjustment amount. For example, when the amount of electric power that can be adjusted by charging the battery 9 of one controllable vehicle Vc so that the SOC thereof increases from 0% to SOC_C % is C0 [Wh], and the target adjustment amount is Cta [Wh], the number of vehicles to be charged is the integer part of Cta/C0. The amount of electric power C0 that can be adjusted by one controllable vehicle Vc is the amount of electric power charged when the battery 9 is charged so that the SOC thereof increases from 0% to SOC_C %, and can be derived from the characteristics of the battery 9 (e.g., the charge electric power curve).

In step S1406, the target vehicle determining unit 204 extracts the vehicle IDs of which the available time T_ctr is not shorter than the predetermined time Tth from among the vehicle IDs extracted in step S1401. As described above, the predetermined time Tth corresponds to the time required for the adjusting charge or discharge control. Different values of the predetermined time Tth may be used for when the adjusting charge or discharge control is the charge control and for when the adjusting charge or discharge control is the discharge control. This is because a time T1 taken to charge the battery 9 so that the SOC thereof increases from 0% to SOC_C % and a time T2 taken to discharge the battery 9 so that the SOC thereof decreases from SOC_C % to 0% can be different from each other. In this case, when the adjusting charge or discharge control is the charge control, the predetermined time Tth is a value corresponding to the time T1, and when the adjusting charge or discharge control is the discharge control, the predetermined time Tth is a value corresponding to the time T2. In the case where the predetermined time Tth is common to both cases, a value corresponding to a longer one of the time T1 and the time T2 may be used.

In step S1408, the target vehicle determining unit 204 determines, as the target vehicles (vehicles to be charged), the number of the controllable vehicles Vc to be charged that is determined in step S1404, in ascending order of the available time T_ctr from among the vehicle IDs extracted in step S1406. In this case, when the number of vehicles to be charged is "k" and there are a plurality of controllable vehicles Vc that have a k-th shortest available time T_ctr, i.e., when there are controllable vehicles Vc with the same value of the available time T_ctr, the target vehicle determining unit 204 determines, as the target vehicles (vehicles to be charged), the number of controllable vehicles Vc to be charged in ascending order of parking duration. The parking duration is the time from the parking start time to the current time, and can be calculated based on the information on the parking start time in the state table (see FIG. 3) inside the state table storing unit 208.

In step S1410, the target vehicle determining unit 204 determines the number of vehicles to be discharged according to the target adjustment amount. For example, when the amount of electric power that can be adjusted by discharging the battery 9 of one controllable vehicle Vc so that the SOC thereof decreases from SOC_C % to 0% is C1 [Wh], and the target adjustment amount is Cta [Wh], the number of vehicles to be discharged is the integer part of Cta/C1. The amount of electric power C1 that can be adjusted by one controllable vehicle Vc is the amount of electric power discharged when the battery 9 is discharged so that the SOC thereof decreases from SOC_C % to 0%, and can be derived from the characteristics of the battery 9.

In step S1412, the target vehicle determining unit 204 extracts the vehicle IDs of which the available time T_ctr is not shorter than the predetermined time Tth from among the vehicle IDs extracted in step S1401. As described above, the predetermined time Tth corresponds to the time taken for the adjusting charge or discharge control.

In step S1414, the target vehicle determining unit 204 determines, as the target vehicles (vehicles to be discharged), the number of the controllable vehicles Vc to be discharged that is determined in step S1410, in ascending order of the available time T_ctr from among the vehicle IDs extracted in step S1412. In this case, when the number of vehicles to be discharged is "k1" and there are a plurality of controllable vehicles Vc that have the k1-th shortest available time T_ctr, i.e., when there are controllable vehicles Vc with the same value of the available time T_ctr, the target vehicle determining unit 204 determines, as the target vehicles (vehicles to be discharged), the number of the controllable vehicles Vc to be discharged in ascending order of the parking duration.

According to the process shown in FIG. 14, the target vehicles are determined from among the controllable vehicles Vc in ascending order of the available time T_ctr. Thus, when a large number of the chargeable-dischargeable vehicles 80 are registered, chances for (the number of times of) being determined as the target vehicle can be equalized (evened out) among the large number of the chargeable-dischargeable vehicles 80. Specifically, for example, a chargeable-dischargeable vehicle 80 owned by a user who tends to use the vehicle at short intervals and leave a short time from the parking start time to the scheduled start time Ts of the next travel, is also given the chances for being determined as the target vehicle. Moreover, a chargeable-dischargeable vehicle 80 owned by a user who tends to use the vehicle at long intervals and leave a long time from the parking start time to the scheduled start time Ts of the next travel, is also given the chances for being determined as the target vehicle, as the available time T_ctr becomes shorter when the scheduled travel start time Ts draws closer.

According to the process shown in FIG. 14, the target vehicles are determined from among the controllable vehicles Vc in ascending order of the parking duration when there are controllable vehicles Vc with the same value of the available time T_ctr. Thus, similarly, when a large number of the chargeable-dischargeable vehicles 80 are registered, the chances for (the number of times of) being determined as the target vehicle can be equalized (evened out) among the large number of the chargeable-dischargeable vehicles 80.

Figure 15:
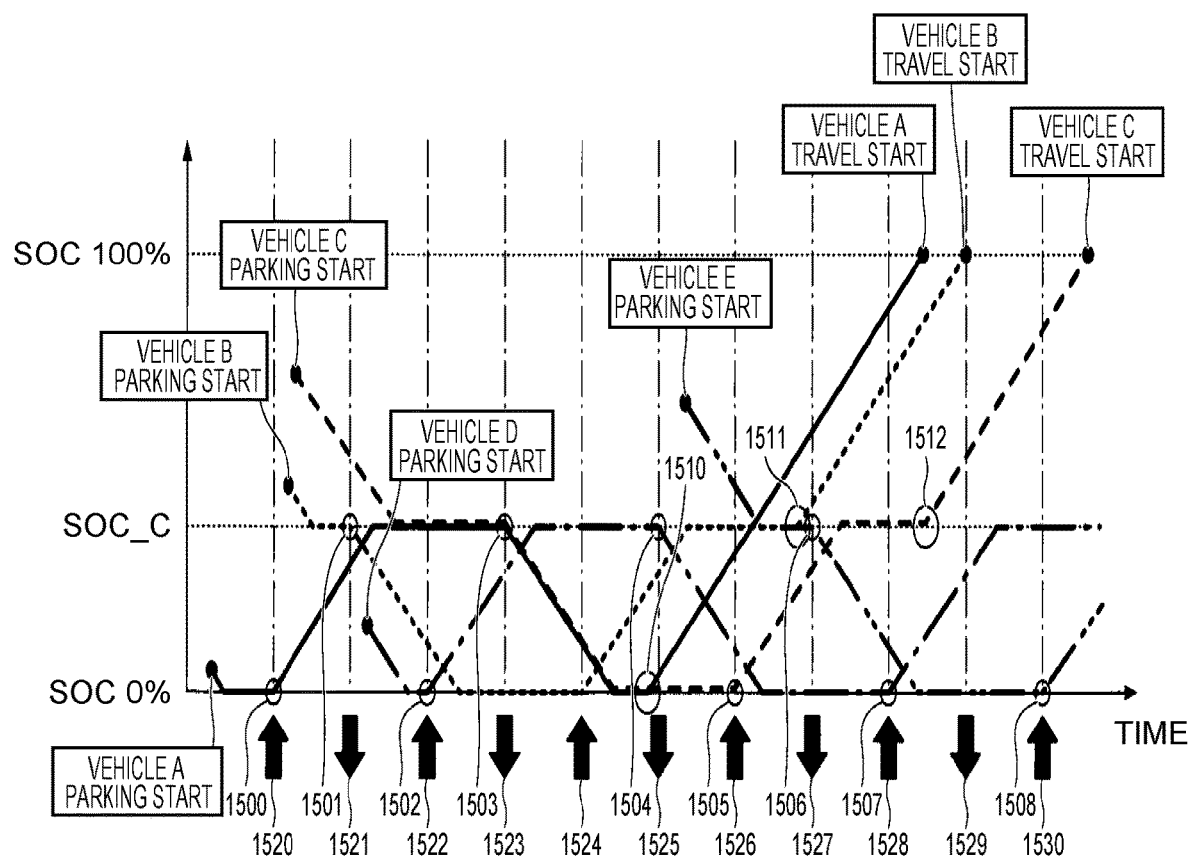
FIG. 15 is an image of an electric power adjustment process in a charge-discharge system 2.
Figure 16:
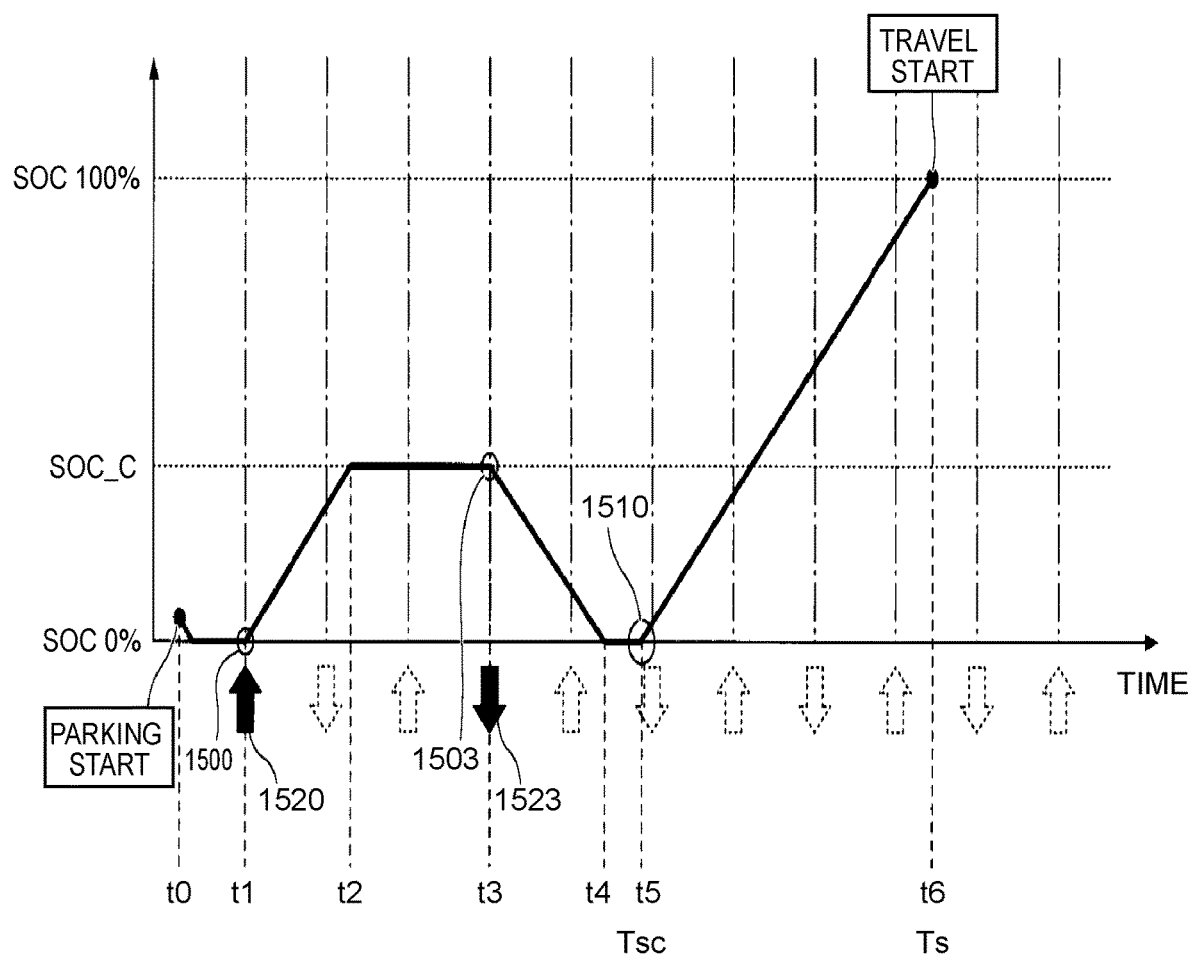
FIG. 16 is a view showing a vehicle A extracted from FIG. 15.

Next, FIG. 15 and FIG. 16 are images of the electric power adjustment process in the charge-discharge system 2. With time on the horizontal axis and the SOC on the vertical axis, FIG. 15 shows changes in the SOC of a plurality of chargeable-dischargeable vehicles 80 (written as vehicles A to D in FIG. 15). With time on the horizontal axis and the SOC on the vertical axis, FIG. 16 shows changes in the SOC of the vehicle A shown in FIG. 15.

In FIG. 15 and FIG. 16, the circles denoted by 1500 to 1508 schematically indicate points in time at which the vehicles A to D receive the charge command or the discharge command from the server 70. The circles denoted by 1510 to 1512 schematically indicate points in time at which the vehicles A to C receive the travel-starting charge start command from the server 70. The downward arrow marks and the upward arrow marks denoted by 1520 to 1530 represent the electric power adjustment requests, with the downward arrow marks representing the discharge requests (demand>supply) and the upward arrow marks representing the charge requests (supply>demand). In the example shown in FIG. 15, the electric power adjustment request is received regularly (e.g., at one-hour intervals), but the electric power adjustment request may be received irregularly.

The plurality of chargeable-dischargeable vehicles 80 including the vehicles A to D are charged or discharged according to the type of the electric power adjustment request as shown in FIG. 15, and thus the electric power adjustment request can be met by using the batteries 9 of the chargeable-dischargeable vehicles 80. This means that allowing the SOCs of the batteries 9 of the parked chargeable-dischargeable vehicles 80 to be adjusted according to the demand-and-supply relationship of electric power in the external electric power system can give the chargeable-dischargeable vehicles 80 the ability to adjust electric power. For example, in a situation where there is an increasing demand for electric power in the external electric power system, the electric power adjustment request that is the discharge request is issued, and accordingly the batteries 9 of the vehicles to be discharged among the plurality of chargeable-dischargeable vehicles 80 are discharged. On the other hand, in a situation where there is an oversupply of electric power in the external electric power system, the electric power adjustment request that is the charge request is issued, and accordingly the batteries 9 of the vehicles to be charged among the plurality of chargeable-dischargeable vehicles 80 are charged.

More specifically, to look at the vehicle A of FIG. 15, the vehicle A starts to be parked at time t0 as shown in FIG. 16. As the SOC at parking start time t0 is lower than SOC_C %, the battery 9 is discharged under the parking discharge control so that the SOC thereof decreases to 0%. When the SOC has decreased to 0% (when the parking discharge control has been completed), the vehicle A becomes the controllable vehicle Vc.

At time t1, the charge request (supply>demand) (see upward arrow mark 1520) is received, and the vehicle A is determined as a vehicle to be charged, so that the battery of the vehicle A is charged. At time t2, the SOC of the battery of the vehicle A reaches SOC_C %. When the battery has been charged so that the SOC thereof increases to SOC_C % (when the adjusting charge or discharge control has been completed), the vehicle A becomes the controllable vehicle Vc again. At time t3, the discharge request (demand>supply) (see downward arrow mark 1523) is received, and the vehicle A is determined as a vehicle to be discharged, so that the battery of the vehicle A is discharged. At time t4, the SOC of the battery of the vehicle A reaches 0%. When the battery has been discharged so that the SOC thereof decreases to 0% (when the adjusting charge or discharge control has been completed), the vehicle A becomes the controllable vehicle Vc again. However, at time t4, the available time T_ctr that is a time left until the charge start time Tsc is shorter than the predetermined time Tth, and therefore the vehicle A is not determined as a target vehicle until the charge start time Tsc. When the charge start time Tsc has come (i.e., when the available time T_ctr has become 0), the travel-starting charge start command (see circle 1510) is received. Accordingly, the battery of the vehicle A is charged until the SOC thereof reaches 100% (travelling charge control). At time t6 (=scheduled travel start time Ts), the travelling charge control has been completed, and the SOC of the battery of the vehicle A is 100%. Thus, the vehicle A can travel the maximum cruising distance on the fully charged battery.

FIG. 15 and FIG. 16 show the electric power adjustment process in the charge-discharge system 2 merely as images, and the aspects of the actual electric power adjustment process are not limited to this example. For example, in FIG. 16, time t6 at which the SOC of the battery of the vehicle A reaches 100% coincides with the scheduled travel start time Ts, but these times do not always coincide with each other due to error etc.

While the embodiments have been described in detail above, the present disclosure is not limited to a specific embodiment, and various changes and modifications can be made thereto within the scope defined by the claims. Moreover, some or all of the components of the above embodiments can be combined.

For example, in the above embodiment, the available time calculating unit 203 calculates the available time T_ctr by using the required charge time Tch that is taken to charge so as to increase the current SOC to the predetermined target SOC, but the present disclosure is not limited to this example. The available time calculating unit 203 may calculate a required charge time Tch' that is taken to charge so that the SOC (SOC_C or 0), which is reached when the adjusting charge or discharge control is executed, increases to the predetermined target SOC, instead of the required charge time Tch, and may calculate the available time T_ctr by using the required charge time Tch'. In this case, the available time calculating unit 203 calculates the charge start time Tsc as a time earlier than the scheduled travel start time Ts by the required charge time Tch'. The available time T_ctr may be calculated as follows: Ta=(scheduled travel start time Ts−current time)−required charge time Tch'. In the above embodiment, the chargeable-dischargeable vehicle 80 starts the travelling charge control upon receiving the travel-starting charge start command from the server 70, but may instead start the travelling charge control voluntarily. Specifically, the chargeable-dischargeable vehicle 80 may similarly calculate the required charge time Tch that is taken to charge so as to increase the current SOC to the predetermined target SOC, and may start the travelling charge control when the time (charge start time Tsc) earlier than the scheduled travel start time Ts by the required charge time Tch has come.

In the above embodiment, when executing the parking discharge control, the charge-discharge control unit 702 determines the standby SOC (SOC_C or 0) according to the SOC at the start of parking, but the present disclosure is not limited to this example. For example, the server 70 may give a command on the standby SOC (SOC_C or 0) to the chargeable-dischargeable vehicle 80 that is travelling or the chargeable-dischargeable vehicle 80 that has started to be parked. In this case, the server 70 may give the command on the standby SOC (SOC_C or 0) so that the controllable vehicles Vc of which the SOC is at SOC_C and the charge status is "standby" in the state table and the controllable vehicles Vc of which the SOC is at 0 and the charge status is "standby" in the state table are present at a predetermined ratio.

What is claimed is:

1. A server for a charge-discharge system, the server comprising a controller configured to communicate with a plurality of registered vehicles each equipped with a chargeable-dischargeable battery, the controller being configured to acquire information on a scheduled start time of a next travel of each of the registered vehicles, the controller being configured to acquire electric power information, the electric power information being one of electric power system information that shows a demand-and-supply relationship of electric power in an external electric power system and an electric power adjustment request that is issued based on the relationship, the controller being configured to determine, based on a scheduled travel start time and the electric power information, a target vehicle of which the battery is to be charged or discharged from among the registered vehicles that are at least parked, wherein the controller being configured to send to the target vehicle one of a charge command that orders the battery of the target vehicle to be charged and a discharge command that orders the battery of the target vehicle to be discharged, wherein the controller is configured to calculate, based on a current time and a charge start time that is determined according to the scheduled travel start time, an available time of each of the registered vehicles that is a time left from the current time until the charge start time, the controller is configured to determine the target vehicle based on the available time and the electric power information, wherein the controller is configured to determine, as the target vehicles, a predetermined number of the registered vehicles in ascending order of the available time, and wherein the controller is configured to determine, as the target vehicles, a predetermined number of the registered vehicles in ascending order of the available time.

2. The server for the charge-discharge system according to claim 1, wherein
the controller is configured to determine the predetermined number based on the electric power information.

3. The server for the charge-discharge system according to claim 1, wherein
the controller is configured to, when demand is exceeding supply according to the electric power information, determine the target vehicle of which the battery is to be discharged, and send the discharge command to the target vehicle of which the battery is to be discharged, and the controller is configured to, when supply is exceeding demand according to the electric power information, determine the target vehicle of which the battery is to be charged, and send the charge command to the target vehicle of which the battery is to be charged.

4. The server for the charge-discharge system according to claim 1, wherein the controller is configured to acquire the electric power information from an external server.

* * * * *